(12) United States Patent
Charlat

(10) Patent No.: US 6,677,067 B2
(45) Date of Patent: Jan. 13, 2004

(54) SAFETY PROCESS AND DEVICE FOR STARTING UP A FUEL CELL

(75) Inventor: Pierre Charlat, Lans en Vercors (FR)

(73) Assignee: L'Air Liquide - Societe Anonyme a Directoire et Conseil de Surveillance pour l'Etude et l'Exploitation des Procedes Georges Claude, Paris Cedex (FR)

( * ) Notice: Subject to any disclaimer, the term of this patent is extended or adjusted under 35 U.S.C. 154(b) by 127 days.

(21) Appl. No.: 09/986,940

(22) Filed: Nov. 13, 2001

(65) Prior Publication Data

US 2002/0058167 A1 May 16, 2002

(30) Foreign Application Priority Data

Nov. 14, 2000 (FR) .............................. 00 14656

(51) Int. Cl.$^7$ ................................................ H01M 8/04
(52) U.S. Cl. .......................................... 429/13; 429/25
(58) Field of Search ...................... 429/13, 26

(56) References Cited

U.S. PATENT DOCUMENTS

| | | | |
|---|---|---|---|
| 4,680,240 A | * | 7/1987 | Furukawa et al. ............ 429/13 |
| 5,149,599 A | | 9/1992 | Kamoshita ................... 429/13 |
| 6,368,737 B1 | * | 4/2002 | Margiott et al. .............. 429/26 |

FOREIGN PATENT DOCUMENTS

| | | | | |
|---|---|---|---|---|
| EP | 1018774 | * | 7/2000 | ............ H01M/8/04 |
| JP | A 55-19713 | | 2/1980 | ............ H01M/8/00 |
| JP | A 2-18869 | | 1/1990 | ............ H01M/8/04 |
| JP | A 2-30068 | | 1/1990 | ............ H01M/8/04 |
| JP | A 3-163762 | | 7/1991 | ............ H01M/8/04 |
| JP | A 7-272738 | | 10/1995 | ............ H01M/8/04 |

* cited by examiner

*Primary Examiner*—Stephen Kalafut
(74) *Attorney, Agent, or Firm*—Young & Thompson

(57) ABSTRACT

A device for starting up a fuel cell includes: two valves (17 and 18) mounted in the inlet and the outlet of the hydrogen circuit of the anode compartment; and a controlled bridge circuit (24) between the inlet of the hydrogen circuit to the anode compartment and either the anode compartment or the ambient.

11 Claims, 1 Drawing Sheet

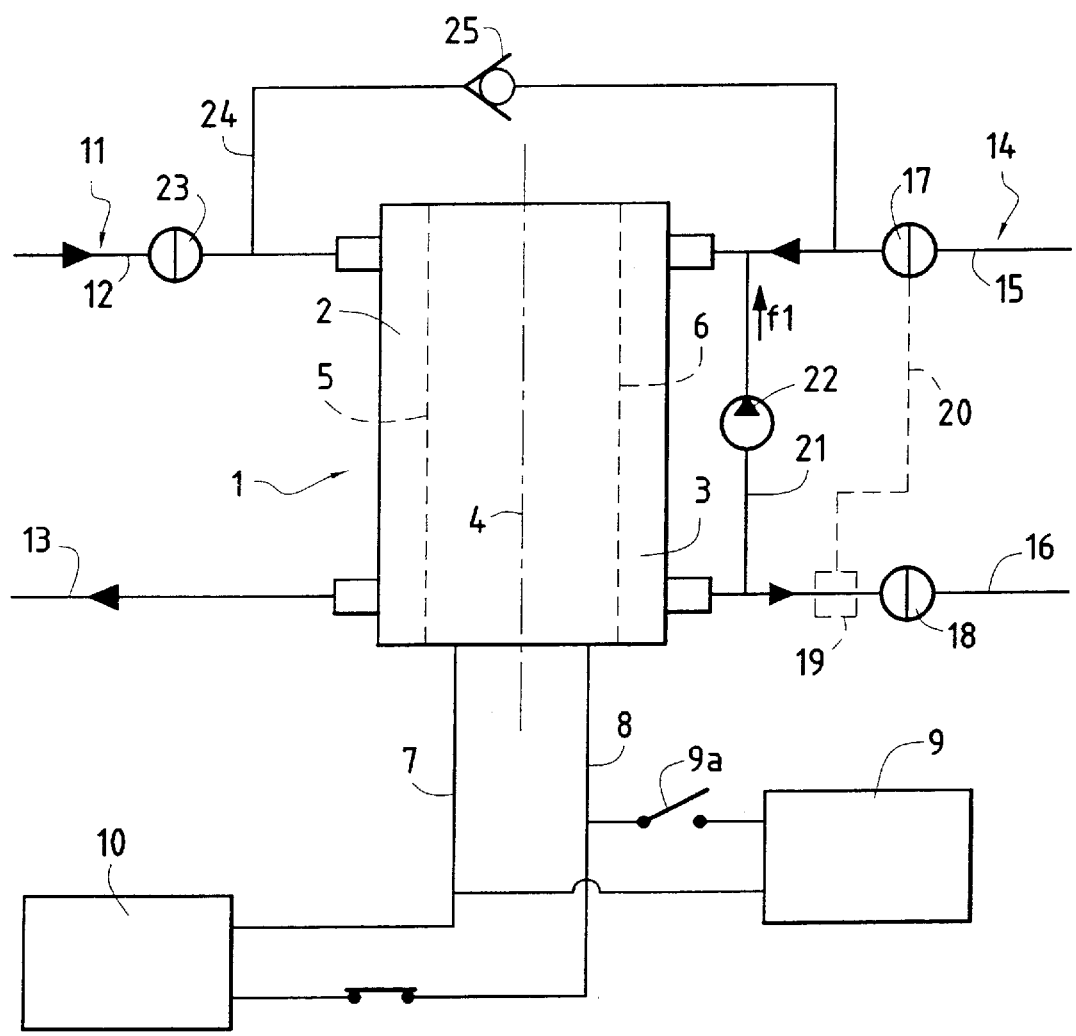

SAFETY PROCESS AND DEVICE FOR STARTING UP A FUEL CELL

FIELD OF THE INVENTION

The invention relates to the field of fuel cells and it addresses more particularly the problem of safety to be observed during startup or stopping phases of a cell using as its gaseous fluid hydrogen and air.

BACKGROUND OF THE INVENTION

In cells of the above type, it is known that it is desirable to maintain and stabilize conditions of supply of the anode and cathode circuits, such that in no case can there be produced, between the hydrogen and the oxygen of the air, an explosive mixture which can be the cause of incidents, or even serious accidents.

However, such a risk can be considered as potential during operation of starting or placing in service when the supply circuit for hydrogen for the anode compartments is located, for reasons of previous use or non-use, at least in part filled with air.

Such is also the case during stopping a fuel cell, given that the drop in pressure which takes place in the anode compartment or compartments by the consumption of hydrogen, the cooling which takes place and the condensation of water, can be the cause of untimely entry of air adapted to give rise, with the residual hydrogen, to an explosive mixture.

These two possibilities are taken in consideration and generally give rise to steps of inerting the anode compartment or compartments by injecting into this compartment or these compartments a neutral gas which can be stored and rendered available as desired.

The automatic control installation of a fuel cell is thus more complicated, more cumbersome and more in need of verification, control and maintenance.

Taking into consideration these requirements leads one objectively to consider whether it is possible to be able to overcome the drawback mentioned above whilst responding positively to the problem of safety, by simplifying the technical means necessary to proceed to shutting down the anode compartment or compartments.

OBJECT OF THE INVENTION

It is thus the object of the invention to propose a new process and new device such that the installation itself of the fuel cell will be able to ensure, by technical, simple, robust reliable and less costly means, a self-shutting down of the anode compartment of the element or elements or cells by an uncomplicated control process which can be used by personnel even who are not specially qualified.

SUMMARY OF THE INVENTION

To achieve the above object, the process of the invention is characterized in that, to ensure the start-up of a fuel cell,
  the hydrogen circuit of the anode compartment or compartments is progressively opened to cause air that may be included to circulate to said compartment in contact with the catalyst of the anode and to cause the formation of water and the production of a neutral gaseous mixture
  simultaneously, the pressure of said neutral gaseous mixture is measured and the complete opening of the hydrogen circuit is ensured after a predetermined time,
  then the nominal hydrogen pressure is stabilized in the anode compartment,
  then the air supply circuit of the cathode compartment is opened, so as to establish stabilized operating conditions.

The invention also has for its object a device designed to practice the processes described above, and adapted for safety during startup of a fuel cell comprising at least one element comprising an anode compartment and a cathode compartment connected, for the anode, to a hydrogen circulation circuit and, for the cathode, to an air circulation circuit, this device comprising:
  two valves disposed respectively in the inlet and the outlet of the hydrogen circuit of the anode compartment,
  at least the valve disposed in the inlet of the hydrogen circuit being progressively controlled.

BRIEF DESCRIPTION OF THE DRAWINGS

Various other characteristics follow from the description given above with reference to the accompanying drawing, which shows, by way of non-limiting example, an embodiment according to the invention.

The single FIGURE is a diagram showing the technical means for practicing the invention.

DETAILED DESCRIPTION OF THE INVENTION

According to this single FIGURE, it will be seen that the object of the invention is to ensure the safety during startup and stopping of a fuel cell 1 which is shown, by way of example, in the form of a single constituent element or cell comprising, in known manner, a cathode compartment 2 and an anode compartment 3 which are separated by a membrane 4. The compartments 2 and 3 contain, respectively, a cathode 5 and an anode 6 which are each associated with a catalyst having the characteristic of permitting the operating reaction in the presence of liquid water.

In known manner, the electrodes 5 and 6 are provided with two terminals 7 and 8 between which, for operation of the fuel cell, there arises a potential difference which is consumed by a charging or consumption circuit such as 9 and/or 10.

Conventionally, the compartment 2 is associated with a circuit 11 for supply of a combustible, preferably air, such a circuit comprising an inlet branch 12 and an outlet branch 13. Similarly, the anode compartment 3 is associated with a hydrogen supply circuit 14, such a circuit comprising an inlet branch 15 and an outlet branch 16.

It follows that the cell, as described above, is structurally arranged differently, for example from a battery of elements 1 whose different compartments 2 and 3 would thus be connected similarly, respectively to the circuits 11 and 14.

To practice the process according to the invention, the cell installation as described above is provided with a device comprising, in the circuit 14, a valve 17 controlling the branch 15 and a valve 18 controlling the branch 16.

The valve 17 can be progressively opening or, on the contrary, of the all or nothing type while being in this case of the calibrated cross-sectional type, if desired adjustable.

The valve 17 can be manually controlled or with controlled opening and, in such case, it is advantageous to arrange it under the control of a detector 19 of the pressure of gas prevailing in the compartment 3 or else of a timer. The detector 19 can be disposed at any suitable point along the circuit 14 and, particularly, in the outlet branch 16. The piloting automatic control is ensured by a line 20 and the means to ensure this automatic control should be considered as being within the skill of the art governing the choice of detector 19 as well as that of the valve 17 whose drive can provide, as previously pointed out, a progressive opening or an all or nothing opening.

The device according to the invention moreover comprises a valve 23 of the all or nothing type which is mounted to control the inlet branch 12 of the circuit 11.

Finally, the device according to the invention comprises a bridge circuit 24 which is established between the branch 15 and either the air circuit 11, for example by its branch 12, or the ambient atmosphere in which said circuit operates. When the bridge circuit 24 is connected to the branch 12, it is advantageous that it be connected between the valve 23 and the inlet of the cathode compartment. The bridge circuit 24 comprises a means 25 for controlling circulation, forming an anti-return in the direction of circuit 14–circuit 11. Such a means 25 can be a clap valve of any suitable type, either with progressive opening, or with all or nothing opening, by being, in such a case, associated with a calibrated passage cross-section which if desired is adjustable.

From the technical explanation above, the process of the invention can be practiced in the following manner:

The single FIGURE shows a static state in which the battery is not in operation. The supply contactor 9a of the circuit 9 is thus open and the valves 17, 18 and 23 are closed.

Considering a phase of placing the cell 1 in service, in the course of which it is absolutely imperative to overcome any risk of creation in the anode compartment 3 of an explosive mixture which would result from the introduction of hydrogen into said compartment whose gaseous mixture it can be used as part of the oxygen.

The object of the invention is to use the presence of the catalyzer on the electrode 6, preferably selected to permit correct operation, even in the presence of moisture and liquid water, so that this catalyzer can assume the function of a catalytic burner under the following conditions.

a) First of all, the valve 18 (outlet) is open, which can be of the all or nothing type, then b) the valve 17 (inlet) can be opened so as to ensure a progressive admission of hydrogen into the compartment 3, so as to create in this latter a circulation seeking to cause the oxygen possibly included in said compartment, on the catalyst and to create the mechanism of recombination leading to the formation of water eliminated by the outlet branch 16.

In this manner, there is caused a "consumption" of oxygen during a predetermined period, for example by means of a timer, such that the gaseous mixture, operating or circulating in the compartment 3, is found progressively to constitute the neutral gas and the hydrogen.

This phase of the process can also be conducted until a pressure of gas is determined which can comprise between 0.8 and 1.2 bar.

The pressure of the compartment 3 can be ascertained by the detector 19 which can control the total opening of the valve 17, such that the circuit 14 supplies hydrogen delivered at a service pressure which can be of the order of 1.5 bar, according to the working pressure of the cell.

c) After this preliminary conditioning phase of the anode compartment 3, the valve 23 can be opened so as to ensure a supply of the cathode compartment 2 with air, so as to create the conventional reaction between the two compartments to give rise to the production of a potential difference between the terminals 7 and 8 adapted to supply, after closing the switch 9a, the load circuit 9.

In the usual manner, the conditions of operation, as well as those of preliminary disabling, lead to the production of neutral gases and water, even of impurities which must be eliminated from the branch 16 by means known in the art.

When the operation of the fuel cell is to be stopped, the inerting process, again to avoid formation of an explosive hydrogen-oxygen mix, consists d) in closing at least the valve 19 whilst leaving the switch 9a closed so that the production of electricity feeds the circuit 9 and, as a result, there takes place a consumption of hydrogen present in the anode compartment 3.

This consumption results in a pressure drop in the compartment 3 to a value below atmospheric pressure, which is that prevailing in the circuit 11 after stopping the air supply or which is that of the ambient medium into which the bridge circuit 24 opens.

This pressure difference results in opening of the valve 25, such that a progressive admission of air is permitted into the compartment 3.

This air admission produces consumption of the residual hydrogen included in the compartment 3 by recombination with the oxygen and formation of water in the compartment 3 which can if desired be eliminated through the branch 16.

The progressive admission of air of the circuit 11 is subject to the opening of the valve 25, which can be of the progressive opening type taking account of the variation of pressure in the compartment 3 or of the all or nothing opening type when the controlled cross-section of passage is of the calibrated type.

In this way, the anode compartment 3 will be progressively occupied by a neutral gaseous mixture, without having undergone risk of formation of an explosive hydrogen-oxygen mixture. Such a gaseous mixture is also favorable to save restarting of the cell 1.

It should be considered that the bridge circuit 24, associated with the valve 25, constitutes an automatic safety means which renders inert the compartment 3 if, for any uncontrolled reason, the hydrogen pressure in this compartment and in the circuit 14 falls below atmospheric pressure.

Moreover, it may be advantageous, according to another arrangement of the invention, to provide, between the branches 15 and 16 of the circuit 14, the presence of a recirculation branch, communicating between the inlet and outlet of the compartment 3 and the valves 17 and 18. The recirculation branch 21 is preferably provided with a pump 22 or with similar means capable of forcing recirculation of the gaseous medium occupying the volume 3 between the outlet branch 16 and the inlet branch 15 in the direction of the arrow $f_1$.

This branch 21 permits ensuring mixing of the gas in the compartment 3 and promotes evacuation of any oxygen that may be present in the startup phase or the consumption of residual hydrogen in the stopping phase, as well as recombination leading to the formation of water.

The invention is not limited to the examples shown and described, because various modifications can be adopted without departing from its scope.

What is claimed is:

1. Process for rendering inert a fuel cell, characterized in that to ensure the startup of said cell
the hydrogen circuit of the anode compartment is progressively opened to cause to circulate any air that may be included in contact with the catalyst of the anode and to bring about the formation of water and to constitute a neutral gaseous mixture simultaneously, the pressure of said gaseous mixture is measured and the complete opening of the hydrogen circuit is carried out after a predetermined time, then the nominal hydrogen pressure is stabilized in the anode compartment, then the air supply circuit of the cathode compartment is opened so as to establish stabilized conditions of operation.

2. Process according to claim 1, characterized in that the pressure of the gaseous mixture is established at about 0.8 bar.

3. Process according to claim 1, characterized in that there is established simultaneously with progressive opening of the hydrogen circuit, a recirculation of the gaseous mixture between the outlet and the inlet of the anode compartment.

4. Process according to claim 3, characterized in that a recirculation of the gaseous mixture is carried out in the anode compartment.

5. A safety device for starting up a fuel cell having at least one element comprising an anode compartment and a cathode compartment, the anode compartment connected to a hydrogen circulation circuit and to a pressure sensor for detecting the gas pressure prevailing in the hydrogen-containing anode compartment, and the cathode compartment connected to an air circulation circuit, wherein:

the hydrogen circuit comprises an inlet branch and an outlet branch and a first valve disposed in the inlet branch and a second valve disposed in the outlet branch; and at least the first valve being a progressively controllable valve under control of the pressure sensor.

6. The device according to claim 5, further comprising a forced recirculation bypass interconnecting the inlet branch and the outlet branch.

7. A safety device for starting up a fuel cell comprised of at least one element comprising an anode compartment connected to a hydrogen circulation circuit having an inlet conduit and an outlet conduit, and a cathode compartment connected to an air circulation circuit having an inlet branch and an outlet branch;

the device comprising:

a first valve disposed in the inlet conduit, and a second valve disposed in the outlet conduit;

at least said first valve being progressively controllable; and a control bridge circuit between the inlet conduit and either the cathode compartment or the ambient, comprising valve means sensitive to pressure, and opening in the direction from the inlet branch toward the hydrogen circuit.

8. The device according to claim 7, further comprising a valve of the all or nothing type, disposed upstream of the bridge circuit on the inlet branch of the air circulation circuit to the cathode compartment.

9. The device according to claim 7, wherein the progressively controllable first valve is controlled by a detector of the prevailing gas pressure in the hydrogen-containing anode compartment.

10. The device according to claim 7, further comprising a branch for forced recirculation between the inlet conduit and the outlet conduit of the hydrogen circuit.

11. The device according to claim 10, wherein the branch comprises means for forcibly circulating gaseous medium.

* * * * *